(12) United States Patent
Li et al.

(10) Patent No.: US 9,135,741 B2
(45) Date of Patent: Sep. 15, 2015

(54) INTERFERENCE-DRIVEN RESOURCE MANAGEMENT FOR GPU-BASED HETEROGENEOUS CLUSTERS

(71) Applicants: Cheng-Hong Li, Princeton, NJ (US); Srihari Cadambi, Princeton, NJ (US); Srimat T Chakradhar, Manalapan, NJ (US); Rajat Phull, Princeton, NJ (US)

(72) Inventors: Cheng-Hong Li, Princeton, NJ (US); Srihari Cadambi, Princeton, NJ (US); Srimat T Chakradhar, Manalapan, NJ (US); Rajat Phull, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 543 days.

(21) Appl. No.: 13/646,661

(22) Filed: Oct. 6, 2012

(65) Prior Publication Data
US 2013/0191612 A1    Jul. 25, 2013

Related U.S. Application Data

(60) Provisional application No. 61/589,447, filed on Jan. 23, 2012.

(51) Int. Cl.
*G06F 15/00* (2006.01)
*G06F 15/76* (2006.01)
*G06T 15/00* (2011.01)

(52) U.S. Cl.
CPC ......... *G06T 15/005* (2013.01); *G06F 2209/501* (2013.01); *G06T 2210/52* (2013.01)

(58) Field of Classification Search
USPC ........................................................ 712/30
See application file for complete search history.

(56) References Cited

U.S. PATENT DOCUMENTS

2007/0294512 A1* 12/2007 Crutchfield et al. .......... 712/200
2013/0162661 A1*  6/2013 Bolz et al. .................... 345/522

OTHER PUBLICATIONS

"Fairness Overview", http://www.adaptivecomputing.com/resources/docs/maui/6.1fairnessoverview.php, Adaptive Computing—Maui Scheduler Manual.

"Dominant Resource Fairness: Fair Allocation of Multiple Resource Types", Ali Ghodsi, Matei Zaharia, Benjamin Hindman, Andy Konwinski, Scott Shenker, and Ion Stoica, University of California, Berkeley, *NSDI* 2011.

"Bubble-Up: Increasing Utilization in Modern Warehouse Scale Computers via Sensible Co-locations", Jason Mars, Lingjia Tang, Robert Hundt, Kevin Skadron, Mary Lou Soffa, *Proceedings of The 44th Annual IEEE/ACM International Symposium on Microarchitecture (MICRO)* 2011.

"Contention Aware Execution: Online Contention Detection and Response", Jason Mars, Neil Vachharajani, Robert Hundt, Mary Lou Soffa *Proceedings of the ACM/IEEE International Symposium on Code Generation and Optimization (CGO)* 2010.

"Supporting GPU Sharing in Cloud Environments with a Transparent Runtime Consolidation Framework", V. T. Ravi, M. Becchi, G. Agrawal, and S. Chakradhar, *Proceedings of the International Symposium on High Performance Distributed Computing*, pp. 217-228, 2011.

(Continued)

*Primary Examiner* — Chun-Kuan Lee
(74) *Attorney, Agent, or Firm* — Joseph Kolodka

(57) ABSTRACT

Systems and methods are disclosed that share coprocessor resources between two or more applications in a computing cluster using a job selector to receive jobs from a job queue; a node selector coupled to the job selector; an off line profiler with an interference prediction model; a coprocessor dynamic interference detection module; and a coprocessor interference response module.

18 Claims, 5 Drawing Sheets

(56) References Cited

OTHER PUBLICATIONS

"The Impact of Memory Subsystem Resource Sharing on Datacenter Applications", L. Tang, J. Mars, N. Vachharajani, R. Hundt, and M. L. Soffa, *Proceedings of the Annual Symposium on Computer Architecture*, pp. 283-294, Jun. 2011.

"Improved Utilization and Responsiveness with Gang Scheduling", D. G. Feitelson and M. A. Jette, D. Feitelson and L. Rudolph, editors, *Job Scheduling Strategies for Parallel Processing, Lecture Notes in Computer Science*, pp. 238-261. Springer Berlin/Heidelberg, 1997.

"Scheduling Techniques for Concurrent Systems", J. Ousterhout, *Proceedings of the International Conference on Distributed Computing Systems*, pp. 22-30, Oct. 1982.

"Paired Gang Scheduling", Y. Wiseman and D. G. Feitelson, *IEEE Transactions on Parallel and Distributed Systems*, 14(6):581-592, Jun. 2003.

\* cited by examiner

INTERFERENCE-DRIVEN RESOURCE MANAGEMENT FOR GPU-BASED HETEROGENEOUS CLUSTERS

This application claims priority to Provisional Application Ser. No. 61/589,447 filed Jan. 23, 2012, the content of which is incorporated by reference.

BACKGROUND

This invention relates to resource management of heterogeneous computing clusters.

Coprocessor-based clusters are those whose nodes have many-core-based coprocessors such as the NVIDIA Graphical Processing Unit (GPU) or the Intel Many Integrated Core (MIC). The coprocessor itself can be a generic concept, not necessarily a "multicore"/"manycore" processor but any processing element that can execute portions of the computation. Such a "coprocessor" can be an FPGA (specialized/customizable computation unit), a standalone processor like IBM Cell, a GPU, a Intel MIC, or any other many core processors. The coprocessor may or may not be connected by a PCI bus; instead, it can be connected by many different types of interconnect. For example, the coprocessor can be on the same chip as the main CPU (such as the AMD Fusion or IBM Cell), or connected by a bus (PCI/PCIe bus).

GPU-based clusters are increasingly being deployed in HPC environments to accelerate a variety of scientific applications. Despite their growing popularity, the GPU devices themselves are under-utilized even for many computationally-intensive jobs. This stems from the fact that the typical GPU usage model is one in which a host processor periodically offloads computationally intensive portions of an application to the coprocessor. Since certain portions of code cannot be offloaded to the GPU (for example, code performing network communication in MPI applications), this usage model results in periods of time when the GPU is idle.

GPUs could be time-shared across jobs to "fill" these idle periods, but unlike CPU resources such as the cache, the effects of sharing the GPU are not well understood. Specifically, two jobs that time-share a single GPU will experience resource contention and interfere with each other. The resulting slowdown could lead to missed job deadlines. Current cluster managers do not support GPU-sharing, but instead dedicate GPUs to a job for the job's lifetime.

The typical coprocessor usage model is one in which the host processor in each cluster node intermittently offloads intensive computations to the coprocessor. This usage model creates gaps in the coprocessor usage, i.e., periods when the coprocessors are idle. Coprocessor idle periods occur when a code block runs on the host and not the coprocessor because (i) it is not sufficiently parallelizable to benefit from the coprocessor, (ii) any performance gains are over-shadowed by overheads such as PCI data movement or (iii) it performs system operations such as network or disk I/O that current many-core coprocessors are incapable of (at least in the offload mode).

Idle periods in coprocessor usage can be reduced or eliminated by "time-sharing" coprocessors across HPC jobs. However, coprocessor time-sharing causes jobs to interfere with each other since it creates resource contention. This inter-job interference slows down jobs, but the precise effect is hard to predict. Most current cluster managers such as PBS Torque and Condor do not generally time-share coprocessors across jobs; rather they dedicate coprocessors to specific jobs until they complete. In some cases, the cluster managers allow users to specify if their jobs can share coprocessor resources. Such jobs are allowed to share coprocessors but the responsibility for any interference-related slowdown rests with the user, since the job was specified to be sharable to start with.

SUMMARY

Systems and methods are disclosed that share coprocessor resources between two or more applications in a computing cluster using a job selector to receive jobs from a job queue; a node selector coupled to the job selector; an offline profiler with an interference prediction model; a coprocessor dynamic interference detection module; and a coprocessor interference response module.

In another aspect, a method for handling compute resources includes coprocessor interference-driven middleware (cluster manager) architecture with (i) offline profiler, (ii) interference prediction model, (iii) node selection algorithm, (iv) coprocessor interference detection module and (v) coprocessor interference response module.

The prediction model can capture signatures of iterative convergent applications, which consist of repetitive coprocessor usage patterns. The prediction model can also be refined at runtime by the dynamic interference detection module. A node selection process is used that is based on predicted interference that assigns job processes to compute nodes. The online interference detection module can include detecting iteration boundaries to compute average time per iteration. The online interference response module can include mechanisms to kill and restart a job, or pause and resume a job that causes interference-related slowdown to exceed some threshold.

Advantages of the preferred embodiment may include one or more of the following. The system achieves faster operation and better cluster-level utilization resulting in lower energy and maintenance costs. The system also provides an analysis of how contention for the coprocessor creates inter-job interference, and affects the job's performance. The system reduces coprocessor interference and idle periods, increasing coprocessor utilization. Given that coprocessors like the GPUs and MICs are relatively expensive and also power hungry, low utilization increases the cluster capital and operational costs. At the highest level, high cluster utilization in HPC heterogeneous clusters is achieved. The system effectively supports GPU time-sharing for real HPC workloads and can predict performance loss when two jobs are co-located on GPU devices and "interfere" with each other. The system also provides an interference-driven scheduling strategy for a cluster job scheduler that attempts to maximize cluster utilization while meeting job deadlines.

DESCRIPTION

When GPUs are time-shared between two jobs, the key factor that determines each job's performance degradation is the manner in which its processes access the GPU devices, i.e., their GPU access patterns. In general HPC applications are iterative in nature, and each iteration of a process accesses the GPU device in a very similar manner. In most applications the GPU access patterns are very much independent from the values of input data.

Qualitatively two aspects relating to the GPU access patterns of an application's process affect the performance degradation experienced by the process and its co-running processes, and the application as a whole. First the CUDA runtime executes kernels from different processes in a FIFO order, allowing only one kernel access to the GPU at any given time. Based on this, the performance degradation due to GPU interference depends on the length of each kernel and the frequency of kernel launches by a process. Particularly, a process using short kernels has less impact on its co-running process's performance because the waiting time of queued kernels from the co-running process is short. Also the performance of a process that launches kernels less frequently is less susceptible to interference due to GPU sharing.

On evaluating the cases where GPU is used as a shared resource between two iterative applications, the non-availability of a GPU can become a major factor in slow-down of an application. In general, GPU based iterative applications performs mix of GPU and CPU computations in each iteration, the CPU processing might involve running sequential code or performing MPI communication with other ranks in the application. The amount of interference due to shared GPU resource between the applications depends on the GPU usage characteristics of the applications. The two applications will interfere more if both the applications are GPU intensive in each iteration. On the other hand, the more GPU compute intensive application can co-exist with an application with lower GPU usage for each iteration. Although GPUs are well utilized (in terms of cores) by compute-intensive kernels, an entire end-to-end application only intermittently offloads computations to GPUs, often causing them to stay idle and thus reducing their utilization.

Figure 1:
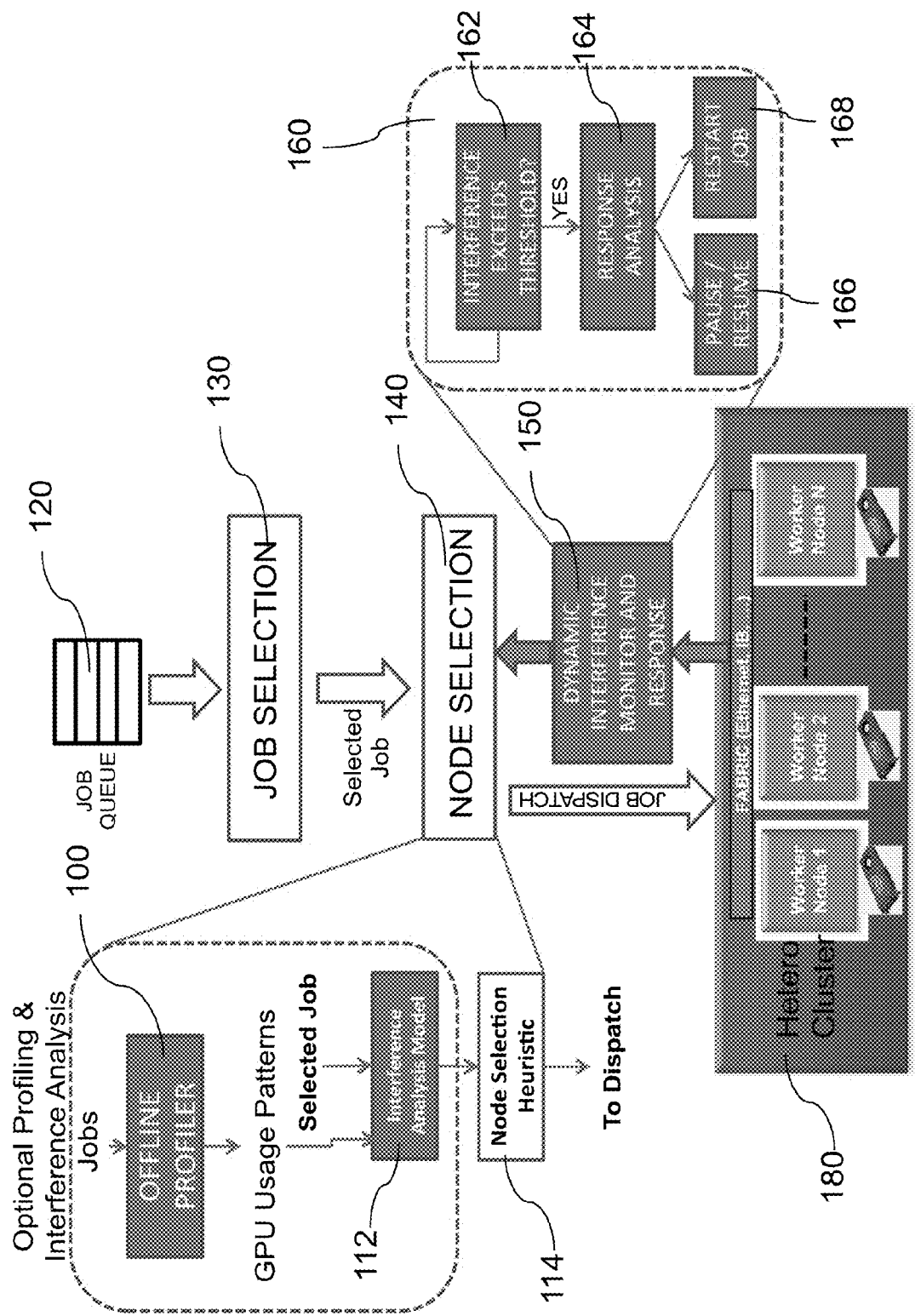
FIG. 1 shows an exemplary architecture of cluster middleware augmented with an interference resource manager.

FIG. 1 shows an exemplary architecture of cluster middleware (e.g., a cluster manager) augmented with an interference resource manager. The middleware includes an offline portion and an online portion. The offline portion consists of a profiler 100, while the online portion consists of an interference prediction model 112 and a monitoring and response unit 150 for handling excessive interference.

The Offline Profiler 100 is detailed next. For each compute job, each job generates runtime signatures which in turn are extracted through either off-line or on-line profiling. These signatures are derived from information on computation performed on CPU and off-loaded to co-processors, and inter-process communications. The information may include resource usage data regarding frequencies, duration, communication volumes (for communication) and repeatability.

The signatures are provided to an interference prediction module 112. The extracted signatures are subsequently used to build an interference-prediction model 112 for a job. Other interference-prediction algorithms can be used to predict the performance degradations of jobs running concurrently on the same compute nodes.

The interference prediction model provides data to a node selection heuristics 114. At runtime, a scheduling algorithm is proposed to schedule jobs to run concurrently on compute nodes based on the predicted performance degradations of concurrent jobs sharing the same compute nodes. The goal of the scheduling algorithm is to optimize various performance metrics, including throughput (number of jobs completed per second), job turnaround time and runtime, power, and etc.

One embodiment of the node selection heuristics 114 can be based on dynamical programming.

The node selection heuristics 114 is then provided to a node selection module 140 which receives jobs selected by a job selection module 130 that in turn receives jobs from a job queue 120. The node selection module 140 dispatches jobs to a computing cluster 180. The cluster 180 executes the jobs and returns performance and response information to a dynamic interference monitor and response module 150.

The dynamic interference monitor and response module 150 continuously monitors the performance of running jobs and determines if the resource contention (interference) causes excessive performance degradation. If the performance degradation of a process exceeds certain threshold, the processes of one or more active jobs are either temporarily halted or killed. If the processes of a job are killed because of contention, the job will be rescheduled. The unit 160 measures performance based on how frequent a process can launch off-loaded computation (called "kernel") to a coprocessor. Then it decides if the interference exceeds a predetermined threshold (162) and if so, performs a response analysis (164). Based on the response analysis, the unit 160 can pause/resume jobs (166) or restart jobs (168).

The system of FIG. 1 predicts and handles interference when two or more jobs time-share GPUs in HPC clusters. The framework consists of an analysis model, and a dynamic interference detection and response mechanism to detect excessive interference and restart the interfering jobs on different nodes. In one embodiment, the framework works with Torque, an open-source cluster manager, and using real workloads on an HPC cluster, show that interference-aware two-job colocation (although the method is applicable to colocating more than two jobs) improves GPU utilization by 25%, reduces a job's waiting time in the queue by 39% and improves job latencies by around 20%.

The system improves GPU utilization by time-sharing GPU devices across multiple jobs; in other words, the system schedules multiple jobs to run on the same compute nodes to GPUs. The system leverages each job process's intermittent GPU usage such that when one process's computation reverts to the host CPU, another process of a different job uses the GPU. Colocated jobs must be dispatched by the cluster manager to the same nodes. Since multiple jobs now access the same GPU devices, the GPUs would be better utilized, especially if one job's GPU access patterns could potentially fill in the idle periods of another job's access patterns.

The ability to schedule jobs to share GPUs and offer performance guarantees is useful for an HPC cluster manager, and critical if coprocessor utilization must be increased. The system provides a three-pronged approach to predict and dynamically handle interference between colocated jobs on GPUs. First, it statically profiles an instance of each job offline, and extracts GPU usage patterns for the job. Second, it builds an interference analysis model that uses the patterns to predict the performance degradation of two jobs when they are colocated and time-share GPUs. Third, the system monitors the performance of colocated jobs, and dynamically relocates jobs that cause excessive or unacceptable performance loss due to interference.

The interference analysis model allows a cluster manager to employ heuristics on top of the scheme and decides if two jobs could time-share GPUs or not. Additionally, a scheme to predict performance degradation due to interference caused by GPU sharing could also be employed in a virtualization framework. For example, two virtual machines (VMs) could be colocated and made to time-share GPU devices if their performance loss is within acceptable limits. GPU virtualization is in its infancy, and schemes that do support it often do not permit VMs to time-share physical GPUs.

The system can also manage space-sharing of GPUs (as opposed time-sharing). The dynamic interference monitor and response module 150 can be readily used to continuously monitor the performance of running jobs and respond to excessive interference. The unit 160 can pause/resume jobs (166) or restart jobs (168), just as in the case of time-sharing.

The system of FIG. 1 monitors performance and utilization trade-offs when real HPC workloads time-share GPU coprocessors. A three-pronged approach for HPC cluster managers can be used to utilize GPUs more efficiently: offline GPU usage pattern extraction, an interference analysis model and online monitoring/response to interference-related performance degradation. One implementation handles coprocessor interference-awareness in PBS Torque, a cluster-level resource management framework, to provide improved utilization as well as overall performance gains on several real HPC workloads.

The goal of the interference analysis is to predict the slowdown of co-running jobs due to contention of the shared resources, like GPU devices and the PCIe buses. In one embodiment, the interference analysis is modeling-based. It only relies on the profiling of a job when the job runs with dedicated resources without GPU sharing. Given the profiling information of a number of jobs, the interference analysis predicts the performance slowdown for all combinations of the co-running jobs.

Several assumptions and observations of GPU-accelerated MPI applications underlies the interference analysis. First the slowdown of a GPU-accelerated MPI job due to GPU contention is determined by the maximum slowdown across all MPI processes of the job. Therefore, the analysis of interference is applied to individual MPI processes running on the same compute node.

Typically, a process of a multi-node HPC job using GPUs for acceleration has a repetitive GPU usage pattern. Such a pattern consists of a series of kernel launches separated by CPU processing (called a "gap") between them. One embodiment targets NVIDIA's GPUs and its CUDA programming framework. In CUDA, when two processes issue GPU kernels, their kernel executions will be interleaved by the CUDA runtime (time sharing). Further such time sharing of GPU device is multi-programmed, i.e., each kernel runs to its completion without preemption.

Based on these observations and assumptions the interference analysis framework extracts the repetitive GPU usage patterns of an application process without GPU contention and then uses such patterns to predict the performance slowdown of two or more co-running processes sharing the same GPU. Next is a discussion on how to obtain the GPU usage pattern of a MPI process using GPU, and then how the patterns can be used to construct an interference analysis model predicting the performance slowdown.

Figures 2A, 2B:
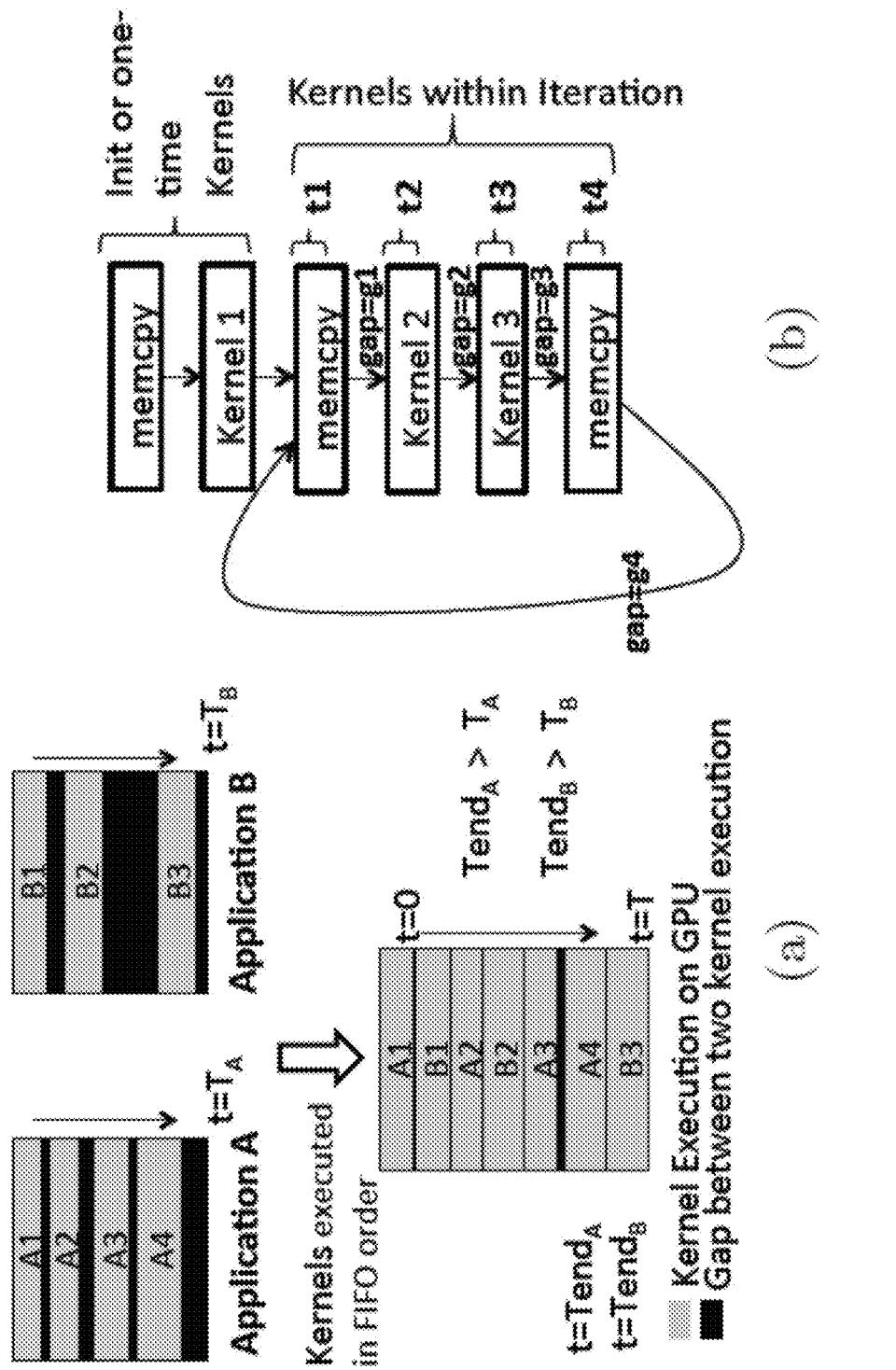
FIGS. 2(a) and (b) show exemplary GPU usage patterns.

FIGS. 2(a) and (b) show exemplary GPU usage—(a) interleaved execution on GPU; (b) Repetitive GPU usage patterns. The interference analysis model takes as inputs the repetitive GPU usage patterns of multiple processes obtained by the aforementioned method and predicts the performance slowdown of each process when the processes share one GPU device. Two prediction methods have been developed. One is based on simulation, while the other is based on timed Petri nets (TPN). The simulation model mimics the FIFO ordering scheduling policy and produces the interleaved execution pattern of multiple processes by using their GPU usage patterns. The individual execution time is compared with the interleaved execution time to predict the slowdown for each process. The TPN method algorithmically computes the slowdown of co-running processes based on cyclic structures in the TPN's state space. Although both methods can handle two or more processes sharing the same GPU device, due to limited space the discussion will focus on the TPN method for two processes sharing one GPU device in the following.

A Petri net is a formal model very suitable for modeling concurrent systems. Usually it is presented as a directed and bipartite graph. It consists of two disjoint sets of vertices: transitions $T=\{t_1, \ldots, t_m\}$ and places $P=\{p_1, \ldots, p_n\}$, and edges $E \subseteq (P \times T) \cup (T \times P)$. FIG. 2 shows a PN, where transitions are solid bars and places are circles. A marking m: $P \rightarrow \{0, 1, 2, \ldots\}$ is an assignment of tokens to places. For example, $p_1$ in FIG. 2 has one token, represented as a small solid circle. A transition is enabled if each of its input places has at least one token. An enabled transition fires immediately. A fired transition removes one token from each of its input places and deposits one token to each of its output places. Here, $t^-(p)$ and $t^+(p)$ denote the changes of the number of tokens at place p due to the firing of transition t: $t^-(p)$ is 1 if $(p, t) \in E$, otherwise $t^-(p)$ is 0. Similarly, $t^+(p)$ is 1 if $(t, p) \in E$, otherwise $t^+(p)$ is 0.

For the purpose of performance modeling the notion of time is introduced into original Petri nets and such Petri nets are called timed Petri nets (TPNs). The interference model uses the variant TPN in which time is associated with transitions [19, 23]. In such TPNs the firing of a transition t takes some non-negative delay d(t), specified by function $d: T \rightarrow R^+ \cup \{0\}$. For example, in FIG. 2 $d(t_1)=5$ and $d(t_2)=7$. During the time interval of the firing [0, d(t)), one token at each of the input places of t is reserved. A token reserved by transition t cannot enable any other transition except t. After d(t) time units elapses, transition t completes its firing and removes the reserved tokens from its input places and adds new, unreserved tokens to its output places. Incorporating the above definitions, the basic structure (the bipartite graph) (P, T, E), the initial marking $m_0$, and the firing delay function D together fully specify a TPN N as a tuple $N=(P, T, E, m_0, d)$.

The behavior of a TPN can be characterized by its reachable states. A state of a TPN has two components: a marking m and a remaining-firing-time (RFT) function $k: T \rightarrow R^+ \cup \{0\}$ assigning to each transition a non-negative number as the amount of firing time remained on the transition [31]. If a transition t is not enabled, k(t)=0. The marking of the initial state of a TPN is the initial marking $m_0$. The RFT function of the initial state assigns each enabled transition t at $m_0$ its firing delay d(t) and the disabled transitions 0. Given a TPN N=(P, T, E, $m_0$, d) at state $s_i=(m_i, r_i)$, a transition $t_s$ enabled at $s_i$ is the first-to-complete transition if $t_s$'s RFT is the smallest among all of the enabled transition at state $s_i$. When $t_s$ completes its firing, the TPN enters a new state $s_j=(m_j, k_j)$. State $s_j$ is directly reachable from state $s_i$, denoted as $$s_i \xrightarrow{t_s} s_j.$$

The new state $s_j$ can be computed from $s_i$ as follows:

$$\forall p \in P, m_j(p) = m_i(p) - t_s^-(p) + t_s^+(p),$$

$$\forall t \in T, k_j(t) = \begin{cases} d(t), & t \text{ is disabled at } m_i \\ & \text{but enabled at } m_j ; \\ \max\{k_i(t) - k_i(t_s), 0\} & \text{otherwise} \end{cases}$$

More generally, state $s_{i_k}$ is reachable from $s_{i_0}$ if there exists a sequence of states $s_{i_1}, s_{i_2}, \ldots$ and transitions $t_{i_0}, t_{i_1}, t_{i_2}, \ldots$ such that $t_{i_j}$ is the first-to-complete transition enabled at state $s_{i_j}$. That is, $$s_{i_0} \xrightarrow{t_{i_0}} s_{i_1} \xrightarrow{t_{i_1}} s_{i_2} \xrightarrow{t_{i_2}} \ldots \xrightarrow{t_{i_{k-1}}} s_{i_k},$$

where R(s) to represent the set of all of the reachable states from state s, including state s.

From the reachability relation between states a directed state graph $G=\{V_R, E_R, A_R\}$ annotated with timing information can be constructed for a TPN N [31]. Given N's initial state $s_0$ and $s_0$'s reachable states $R(s_0)$, each vertex $u \in V_R$ corresponds to a state $s_u \in R(s_0)$. There is an edge connecting from vertex u to v, or $(u,v) \in E_R$, if and only if $s_v$ is immediately reachable from state $s_u$. The function $A_R$ annotates each edge $(u,v) \in E$ with two information: the transition $t_u$ that brings state $s_u$ to $s_v$, and the RFT of $t_u$ at $s_u$, which is the elapsed time of the state transition from $s_u$ to $s_v$.

The TPN interference model is derived "compositionally" from the GPU usage patterns of the individual processes. At most two processes share the same GPU-equipped compute node and that the CUDA's runtime schedules kernels from different processes in FIFO order.

Figure 3:
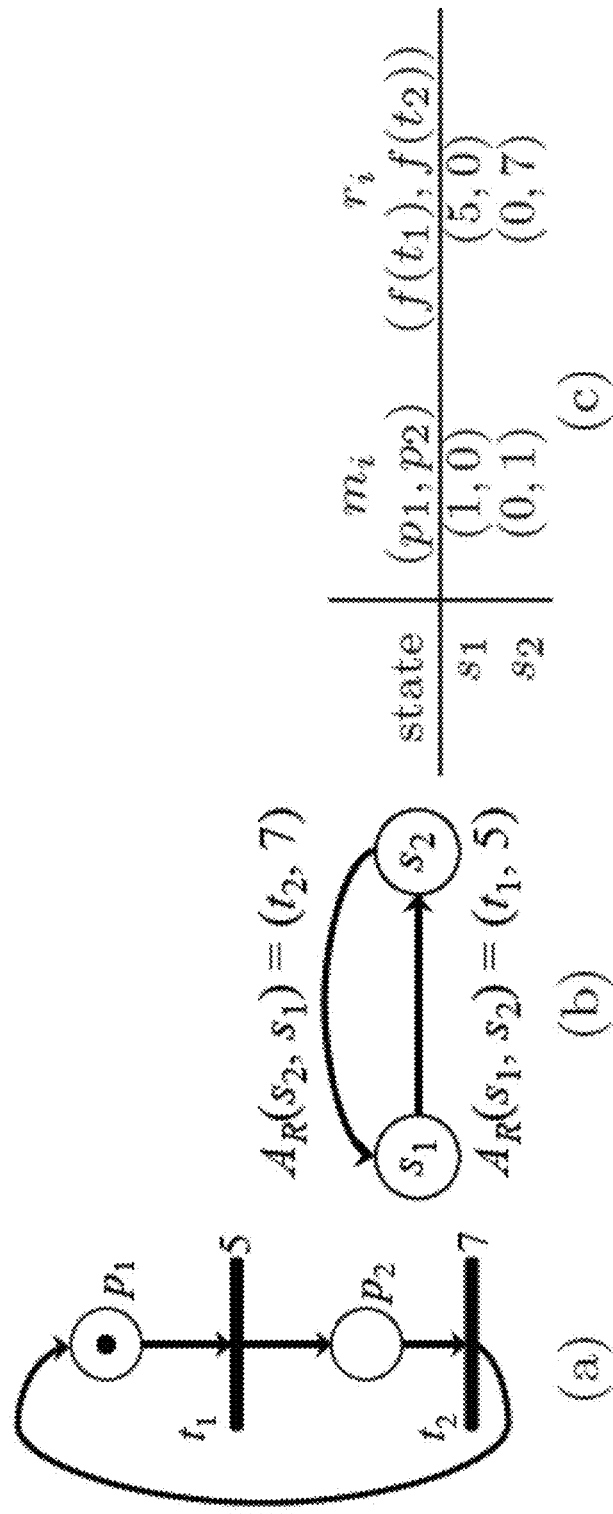
FIGS. 3(a), 3(b) and 3(c) show different aspects of an exemplary time Petri net (TPN) model for two GPU-sharing processes.
Figure 4:
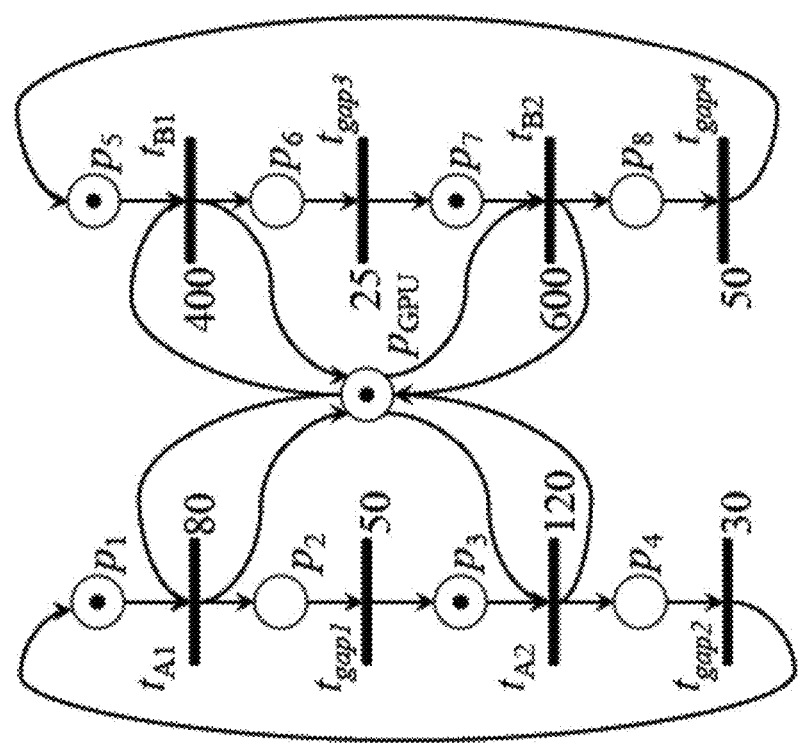
FIG. 4 shows a complete TPN interference model of two processes.
Figure 5:
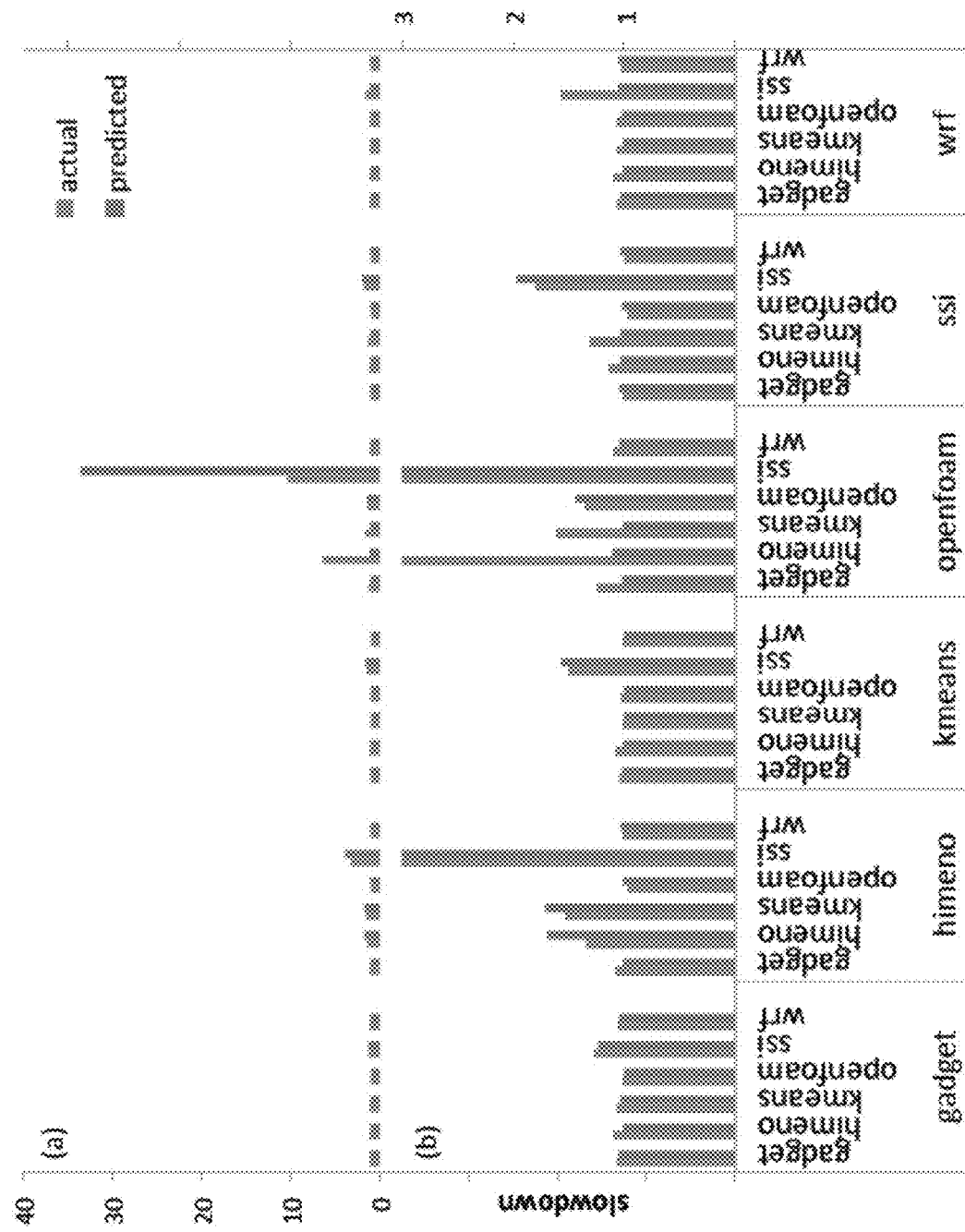
FIG. 5 shows actual and TPN-predicted slow-down of pairs of two-node, collocated MPI applications

FIG. 3 shows different aspects of an exemplary time Petri net (TPN) model for two GPU-sharing processes. FIG. 3(a) shows a simple TPN, and its state space and states are reported in FIG. 3(b) and FIG. 3(c), respectively. FIG. 4 shows a complete TPN interference model of two processes, while FIG. 5 shows actual and TPN-predicted slow-down of pairs of two-node, collocated MPI applications. The TPN modeling the interference between two processes has two groups of transitions and places, each of which corresponds to the GPU usage pattern of one of the two processes. Each activity a in the usage pattern of a process is modeled by a TPN fragment, which is a place $p_a$ and its output transition $t_a$. The transition's firing time equals the activity's duration. If an activity a is followed by activity b in the usage pattern, transition $t_a$ is connected to activity b's place $p_b$. The place of the first activity in the usage pattern of a process has one initial token, representing the process's control flow.

The GPU as a shared resource is modeled in the TPN as a place $p_{GPU}$ connecting to transitions corresponding to activities accessing the GPU. Both kernel executions and data transfers between the host and the GPU (cudaMemcpy) are such activities. In the case that a kernel execution and a memory transfer are overlapped, both the execution and the memory transfer will be treated as one GPU-accessing activity. Place $p_{GPU}$ has an equal number of initial tokens as the number of GPUs of the compute node, and is assumed to be one in the discussion. If activity a uses GPU, transition $t_a$ is both an input and output transition of $p_{GPU}$, meaning $t_a$ is enabled only if there is a token in place $p_a$ (the program control flow reaches the point to start activity a) and $p_{GPU}$ (the GPU is idle). Once $t_a$'s firing completes, it deposits the GPU token back to place $p_{GPU}$.

The runtime slowdown experienced by two processes sharing the GPU on a compute node can be estimated from the state graph of their TPN interference model. First notice that the TPN model is structurally bounded and has a finite number of reachable states because of its rational firing delay. Therefore any instance of the TPN model has a bounded state space and its state graph is cyclic. Based on these observations, the following simple algorithm computes the elapsed runtime of one iteration of the repeatable pattern of a process:

1. Select an activity a in the repeatable pattern of the process.
2. For each edge (i, j) (annotated with a transition $t_{ij}$ and the transition's RFT $k(t_{ij})$) on the state graph, assign a weight $\tau_{ij}=1$ to edge labeled with transition $t_{ij}=t_a$ and 0 for any other transition.
3. For a cycle W in the state graph, define a ratio $c(W)=\Sigma_{(i,j) \in W} k(t_{ij})/\Sigma_{(i,j) \in W} \tau_{ij}$. Compute the maximum ratio $\mu = \max_w \{c(W)\}$ across all cycles in the state graph using the minimum cost-to-time ratio cycle algorithm [6]. Return $\mu$.

The computed maximum ratio $\mu$ in the last step is an predicted upper bound of the elapsed runtime of one iteration of the process's repeatable pattern. Notice that the TPN model is not completely accurate, so the predicted upper bound of the runtime may be smaller than the actual.

The interference-aware scheduler and the resource manager (the framework) include several components running on a management server and one or more user-level monitoring agents running on each compute node. In particular, on the server side the scheduler maintains one or more job queues, selects a job from the queue (job selection), assigns the processes of the selected job to compute nodes (node selection), while continuously responding to monitoring agents running on each compute node. A monitoring agent is a light-weight, user-level runtime that observes the performance of a process and reports its findings to the server-side scheduler. It also receives instructions from the server-side scheduler to perform corrections if excessive interference is detected.

To make the interference-aware framework as general as possible, one embodiment is an enhancement to a conventional job scheduler like Torque. The interference-aware framework starts to schedule jobs to share compute nodes and their co-processors only after the conventional job scheduler cannot find enough idle nodes to be dedicated to the next job waiting in the queue. Therefore to simplify the discussions, an example discussion is discussed next on the situation that there are not enough idle compute nodes and the framework is triggered to schedule jobs to share resources.

Although the framework can handle all types of jobs, it only allows jobs satisfying certain requirements to share compute nodes and co-processors with other jobs. The first requirement is that a job's peak GPU device memory footprint must be known to the framework. Using the information of the peak GPU memory footprint, the framework avoids scheduling two job processes whose total GPU memory footprint exceeds the amount of memory on the GPU device on the same compute node. The peak GPU memory footprint can be obtained through profiling or runtime monitoring tools like nvidia-smi. Users can also provide the peak GPU memory footprints of their applications to the framework.

The second requirement is that the processes of a job must have repetitive GPU usage patterns. This is because the interference-aware framework relies on repetitive kernel calls to perform an on-line monitoring and response mechanism (explained shortly) to mitigate or eliminate excessive interference between multiple job processes running on the same node. Notice that the framework does not need to know the patterns in advance, as long as the patterns are detectable at runtime. If a job does not meet either of the two requirements, the framework will schedule it to only run on dedicated compute nodes without any sharing.

In one embodiment, GPU usage profiling extracts the GPU usage patterns of a job required for interference analysis. Either the user uses the GPU usage characterization method to extract the GPU usage pattern for each process of the job, or other approaches that can obtain GPU usage patterns without user involvement are adopted. For the latter, one possibility is to use an infrastructure like the Google-Wide profiling to continuously profile running jobs and store the collected patterns in a database for later use. The scheduler can also perform a pilot run with dedicated compute nodes of a submitted job to get the usage patterns. In an alternative embodiment, the GPU usage patterns of a job is user-provided.

Since job profiling may not always be possible, the scheduler does not require such information to be provided. If a job's GPU usage patterns are not available, the framework will skip the interference analysis and schedule the job to share randomly selected compute nodes with other active jobs. Although a random scheduling decision may lead to excessive interference between multiple job processes running on the same node, the framework employs a novel on-line monitoring and response mechanism to handle such a situation.

Different selection policies can be used to select a job from the job queue. Examples include FCFS, shortest-job-first (SJF), or other priority-based policies adopted by system administrators. The job queue can thus be viewed as a priority queue, where the priority function can be the job submission time in FCFS policy, the estimated job runtime in SJF, or some customized assignments based on local administrative policies.

The framework uses two node selection heuristics to dispatch the processes of the selected job to compute nodes. The choice between the two heuristics depends on whether the GPU usage patterns of the job processes are available. The first heuristic schedules the selected job to run on randomly selected compute nodes. It is used if the GPU usage patterns of the selected job are not available.

The second node selection heuristic dispatches the processes of the selected job to compute nodes in a way that the performance degradation due to runtime interference is minimized. The framework uses this heuristic if the GPU usage patterns of the selected job for interference analysis is available. To predict potential interference, the framework also stores copies of the GPU usage patterns of all of the running jobs. Based on these stored patterns, the framework applies the interference analysis to estimate the runtime slowdown of different node selections. Using the slowdown estimation as the cost function, the scheduler then uses a dynamic programming algorithm to select one node for each process of the selected job such that the cost of interference is minimized.

The dynamic programming (DP) algorithm finds the optimal node assignment for each of the m processes of a job to n compute nodes. All of the m processes have identical GPU usage patterns and all of the n compute nodes have the same computing capability. Let $c(p, k)$ be the minimum cost of scheduling p processes of the selected job to the first k compute nodes of the cluster, then $$c(p,k)=\min \{c(p,k-1), c(f(p-1,k-1)\|(p \to k))\}, \quad (1)$$

where $f(p-1, k-1)$ is the optimal node assignment for the $(p-1)$ processes to the first $(k-1)$ compute nodes, and $c(f(p-1, k-1)\|(p \to k))$ is the cost of combining the solution $f(p-1, k-1)$ and assigning the p-th process to the k-th compute node. The base cases of the resursive cost function in the dynamic programming procedure are the respective costs of assigning one process to different compute nodes, which can be predicted by the interference analysis model. Using (1) the node selection algorithm iterates over a m-by-n table to compute $c(m, n)$. With some additional bookkeeping the optimal node selection $f(m, n)$ can be easily constructed.

The DP algorithm can also handle a job that needs to run on dedicated compute nodes. Such scenarios can arise if the peak GPU memory footprint of any of the job's processes does not leave room for any other job process to run on the same compute node, or the service agreement of a job mandates dedicated resources. To make sure a compute node k is never selected by the algorithm, the system can simply set the cost of scheduling any process to k to a very large value.

Several different cost functions can be used. One alternative cost function is the maximum predicted slowdown among all jobs, including the ones already running and the ones to be scheduled. Another option is to take the sum of the slowdown of each job.

The framework employs an on-line monitoring mechanism to detect excessive interference. If a job is scheduled to run on compute nodes with active jobs, the interference between the co-running jobs is monitored. If a newly scheduled job causes too much interference and therefore inflicts excessive performance slowdown on any active job or the new job, the new job is terminated. The terminated job is immediately re-submitted (retaining its original position in the queue) for scheduling. The terminated job will only be rescheduled on idle nodes and will therefore have dedicated resources. Although the rescheduled job runs on dedicated nodes initially, later on the framework may schedule other jobs to be colocated with it.

The server-side scheduler coordinates with local monitoring agents to monitor the behavior and measure the performance of each active job in two phases for a limited period of time. The first monitoring phase identifies whether a job has repetitive kernel calls and measures the performance of a job without any interference, while the second one measures the performance of a job with interference due to contentions to all resources, not just the GPU devices.

The first monitoring phase takes place right after a job is started to run on compute nodes. During this phase the local monitoring agents ensure that the processes of the job run in exclusive mode without any interference by temporarily stopping processes of any other job running on the same nodes. A local monitoring agents identifies any repetitive CUDA kernel call and computes the average frequency of the identified repetitive kernel call (the identification and measuring mechanism will be detailed shortly). The monitoring agents then report their findings back to the server-side scheduler. The lowest kernel-call frequency among all processes of the job is used as the job's performance under no interference and cached by the server-side scheduler.

If two or more processes of different jobs share the same compute node, the framework triggers the second monitoring phase following the first monitoring phase. In the second monitoring phase all processes are run simultaneously free without throttling. The local monitoring agent measures the kernel frequency of each process and sends the measured values back the server-side scheduler. For each monitored job, the server-side scheduler uses the lowest kernel frequency across all of the job's processes as its performance under interference.

Notice that using the kernel frequency captured in the second monitoring phase as the performance measure reflects all possible interferences not limited to the GPU contention. Such a performance measure is also independent from various optimization techniques, like running multiple kernels issued by different processes simultaneously and overlapping communication and computation. This is because factors like optimizations or other interferences due to memory system and network contentions essentially affect not just the elapsed run time but also the intervals between repetitive kernel calls.

Each local monitoring agent uses a function-intercepting technique to carry out process monitoring and throttling. The monitor agent intercepts both CUDA and MPI function calls initiated by processes. For performance monitoring, the monitoring agent measures how frequently a process launches a specific CUDA kernel. More specifically, once a kernel function is initiated, the monitoring agent intercepts the call, records the wall time of the call, and then immediately forwards the call to the real CUDA runtime library. For a process to be identified as having repetitive kernel calls, at least the same kernel call must be initiated N times within T seconds. In the prototype N is set to 25 and T is 30 seconds. If this condition is not satisfied, the process is treated as not having repetitive kernel calls. Otherwise the local monitoring agent computes the kernel frequency, defined as the ratio between the number of successive kernel calls and the elapsed time, and uses it as the performance metric. The measured performance is returned to the server-side scheduler by a dedicated communication thread to minimize the disruption of normal execution. The thread also handles throttling instructions from the scheduler. Once the throttling message is received, the thread sets a flag which causes either the next CUDA or MPI call to be blocked. On the other hand, when the scheduler sends a message to resume the execution, the thread clears the flag to re-activate the blocked call. For the CUDA and MPI function calls to be intercepted, the execution binary of a job is dynamically linked to customized proxy libraries of CUDA and MPI, which are based on NVIDIA's CUPTI and mpiP.

After receiving performance measurements with and without interference, the framework decides whether the performance degradation is acceptable. Let $P_i$ and $P_i'$ be the lowest kernel frequency of job $J_i$ without and with interference, respectively, two possible interference criteria are considered. The first criterion caps the slowdown to a predetermined threshold T, that is, max $P_i/P_i' \leq T$. The second criterion allows job $J_N$ to continue if and only if for each job $J_i \in \{J_1, \ldots, J_k\}$ that shares compute nodes with $J_N$, $$\max\left\{\frac{1}{P_i'}, \frac{1}{P_N'}\right\} \leq K\left(\frac{1}{P_i} + \frac{1}{P_N}\right), \quad (2)$$

where K is a number between 0 and 1, referred to as the interference threshold. The prototype implementation uses (2) to decide if the interference caused by new job $J_N$ is excessive. If the interference is excessive, two response mechanisms are possible: (a) the scheduler terminates $J_N$'s execution and re-schedules it by inserting $J_N$ back to its original position in the job queue. $J_N$ will then be rescheduled to idle compute nodes, or (b) the scheduler allows $J_N$ to continue its execution in a restrained fashion by periodically throttling $J_N$'s execution using the on-line throttling mechanism described earlier. The length of the throttling period is dynamically adjusted based on whether the interference criterion (like (2)) is satisfied.

If the local monitoring agent cannot detect any repetitive kernel calls of a process, the framework will schedule the job to run exclusively on the dedicated compute nodes. If a job without detectable repetitive kernel calls is launched on compute nodes where no other jobs are running, the framework will run the job exclusively and avoid to schedule any new job to be colocated with it. On the other hand, if a job without detectable repetitive kernel calls is run on compute nodes with other existing active jobs, the job will be terminated and rescheduled as if it causes excessive interference.

The above system supports time-sharing of GPUs across jobs to improve coprocessor utilization. The interference-driven cluster management framework for GPU-based heterogeneous clusters applies interference analysis model to predict the performance slowdown of co-running jobs sharing GPU coprocessors, and an on-line dynamic interference monitoring and response mechanism that automatically restarts jobs if the measured interference exceeds a threshold. The framework allows multiple jobs to share the same set of GPUs under the GPU memory constraint. In one implementation with a two-job colocation in Torque, an open-source cluster manager with real-world, multi-node, GPU-accelerated HPC applications, the framework improves GPU utilization by 25%, reduces a job's waiting time in the queue by 39% and improves job latencies by 20 to address the issue of low coprocessor utilization in HPC clusters.

What is claimed is:

1. A system to share coprocessor resources between two or more applications in a computing cluster, comprising:
    an offline profiler with an interference prediction model;
    a job selector to receive jobs from a job queue;
    a node selector coupled to the job selector;
    a coprocessor dynamic interference detection module; and
    a coprocessor interference response module
wherein the node selector decides whether a performance degradation is acceptable, wherein $P_i$ and $P_i'$ are lowest kernel frequency of job $J_i$ without and with interference, respectively, wherein the node selector considers a first interference criteria that caps the slowdown to a predetermined threshold T, that is, max $P_i/P_i' \leq T$, and wherein the node selector considers a second criteria that allows job $J_N$ nodes with $J_N$, using $$\max\left\{\frac{1}{P_i'}, \frac{1}{P_N'}\right\} \leq K\left(\frac{1}{P_i} + \frac{1}{P_N}\right).$$

2. The system of claim 1, wherein the resources comprise on or more co-processing elements coupled to the main CPUs.

3. The system of claim 2, wherein the co-processing elements include FPGAs, IBM Cell processors, graphical processing units (GPUs), Many Integrated Cores (MICs), or many core processors.

4. The system of claim 1, wherein the interference prediction model captures application signatures including repetitive coprocessor usage patterns.

5. The system of claim 1, wherein the interference prediction model is refined at runtime by the dynamic interference detection module.

6. The system of claim 1, wherein node selection is based on predicted interference that assigns job processes to selected coprocessor(s).

7. The system of claim 1, wherein the dynamic interference detection module detects iteration boundaries to compute average time per iteration.

8. The system of claim 1, wherein the interference response module kills and restarts a job, or pauses and resumes a job that causes interference-related slowdown to exceed a predetermined threshold.

9. The system of claim 1, wherein the interference prediction module uses a simulation model or a timed Petri nets (TPN) model.

10. The system of claim 1, wherein the interference prediction model simulates a FIFO ordering scheduling policy and produces an interleaved execution pattern of multiple processes by using GPU usage patterns.

11. The system of claim 1, wherein the node selector chooses a number of compute nodes in the cluster to execute to the selected job JN, wherein the node selector either randomly selects the nodes, or uses a dynamic programming procedure to select compute nodes so that the predicted performance degradation due to resource sharing between active jobs that already run on the selected compute nodes and the new job JN is minimized.

12. The system of claim 1, wherein the interference response module reduces the interference due to resources contention, wherein the interference response module terminates a newly scheduled job JN that causes excessive performance degradation detected by the dynamic interference detection module and re-schedules it by inserting JN back to its original position in the job queue, or the interference response module allows JN to continue its execution in a restrained fashion by periodically stopping JN's execution for an adjustable period of time.

13. The system of claim 1, comprising an offline profiler with an interference prediction model.

14. A method for system to share coprocessor resources between two or more applications in a computing cluster, comprising:
transferring a job from a job queue to a node selector;
performing profiling of (Original) The system off line to generate an interference prediction model;
dynamically detecting interference; and
responding to the interference;
wherein the node selector decides whether a performance degradation is acceptable, wherein $P_i$ and $P_i'$ are lowest kernel frequency of job $J_i$ without and with interference, respectively, wherein the node selector considers a first interference criteria that caps the slowdown to a predetermined threshold T, that is, max $P_i/P_i' \leq T$, and wherein the node selector considers a second criteria that allows job $J_N$ nodes with $J_N$, using $$\max\left\{\frac{1}{P_i'}, \frac{1}{P_N'}\right\} \leq K\left(\frac{1}{P_i} + \frac{1}{P_N}\right).$$

15. The method of claim 14, wherein the interference prediction model captures application signatures including repeatable coprocessor usage patterns.

16. The method of claim 14, wherein the interference prediction model is refined at runtime by the dynamic interference detection module and node selection is based on predicted interference that assigns job processes to selected coprocessor(s).

17. The method of claim 14, wherein the dynamic interference detection module detects iteration boundaries to compute average time per iteration and the interference response module kills and restarts a job, or pauses and resumes a job that causes interference-related slowdown to exceed a predetermined threshold, wherein the interference prediction module uses a simulation model or a timed Petri nets (TPN) model.

18. The method of claim 14, wherein the simulation model mimics a FIFO ordering scheduling policy and produces an interleaved execution pattern of multiple processes by using GPU usage patterns.

* * * * *